Dec. 8, 1953 C. S. WEYANDT 2,662,193
DOUBLE-ACTING CIRCULAR RECIPROCATING ELECTROMAGNETIC MOTOR
Filed April 25, 1951 2 Sheets-Sheet 1
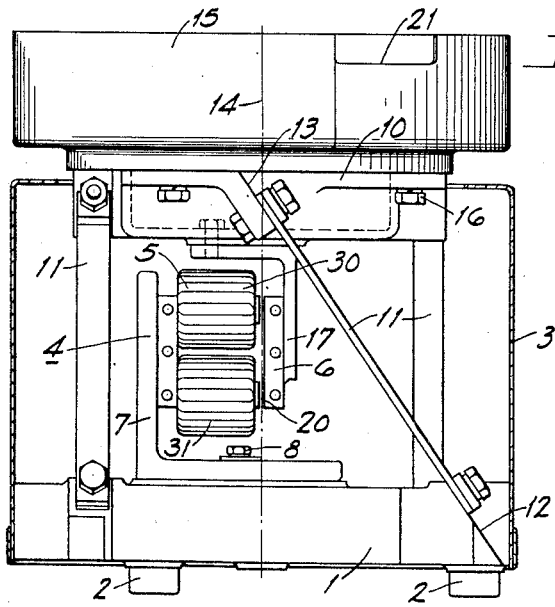
INVENTOR.
Carl S. Weyandt
BY
William D. Carothers
His Attorney.

INVENTOR.
Carl S. Weyandt
BY William D. Carothers
His Attorney.

Patented Dec. 8, 1953

2,662,193

UNITED STATES PATENT OFFICE 2,662,193

DOUBLE-ACTING CIRCULAR RECIPROCATING ELECTROMAGNETIC MOTOR

Carl S. Weyandt, Indiana, Pa.

Application April 25, 1951, Serial No. 222,840

8 Claims. (Cl. 310—38)

1

This invention relates generally to electromagnetic reciprocating motors for use as circular feeder motors or circular packing motors and more particularly to such motors having a plurality of forces to be alternately effective to reciprocate the moving parts in both directions to provide a circular operating double-acting electromagnetic reciprocating motor.

The principal object of this invention is the provision of a circular reciprocating motor having a frame supported by flexible elements positioned uniformly about a central axis and constructed to permit reciprocating motion of the frame in a confined inclined arcuate path of movement. The actuating forces may be obtained from a plurality of electromagnetic field members symmetrically operating on armature means carried by the frame and wherein selected of said field members cause the frame to move in opposite directions. This circular reciprocating motor is double-acting in that one energy impulse is effective in reciprocating the frame up and one alternating energy impulse is effective in reciprocating the frame down the confined inclined arcuate path of movement. The flexible supporting means is preferably tuned to a natural period which is close to the normal frequency of the driving current impulses, and the alternating impulses of the field members maintain the reciprocation of the frame member in synchronism with the driving current impulses. The advantage of a circular motor of this character is in the increased power obtained by the double action of the electromagnetic motor. This is particularly advantageous for packing, conveying around corners, circular conveyors, circular dryers, screening, and helical conveyors generally. In helical feeders the articles are selected and conveyed in turn up an incline conveying surface in a bowl to another elevation where they are directed out of the bowl to a machine that utilizes each article in turn that is fed thereto. The positive driving impulse in both directions by this double-acting motor transmits greater conveying impetus to the material. This improves conveying materials of relatively small mass along an arcuate, a circular or an upward helical path.

This double-acting circular vibratory motor may provide two alternately energized field members or four field members connected in pairs to be alternately energized as a double-acting electromagnetic motor. The multiple pairs of field members in these double-acting circular motors provide for increased driving power with substantially the same total energy and space as a single-acting motor of the same size. One or two coil members of a four-coil motor may be supplied with each field member and can be connected in a circuit to match the potential available in the field. Thus two coils may be

2 connected in multiple for low voltage and in series for high voltage. This is an advantage in production when a change in the circuit connection is the only change required for operating these circular motors at different voltages.

The alternately energized field members of the double-acting motor comprising this invention may be supplied with alternate energy impulses from alternating current source by employing rectifiers to energize one set of field members during one-half of the alternating current and the other set of field members during the other half of each alternating current wave. Thus a double-acting electromagnetic motor employs the full alternating current wave.

Another manner of alternately energizing the field members of a double acting motor is by employing permanent magnet armatures. The poles of the field and armature members must be matched to alternate attracting forces and alternating repulsing forces. With a permanent magnet type motor no rectifiers are required.

Other objects and advantages appear hereinafter in the following description and claims.

The accompanying drawings show, for the purpose of exemplification without limiting the invention or claims thereto, certain practical embodiments of the invention wherein:

Fig. 1 is a view in side elevation of a double-acting circular electromagnetic motor comprising this invention.

Fig. 2 is a view in end elevation of the structure shown in Fig. 1.

Fig. 3 is a detailed horizontal sectional view of an electromagnetic motor similar to that shown in Figs. 1 and 2 but having permanent magnet armatures.

Figure 4:
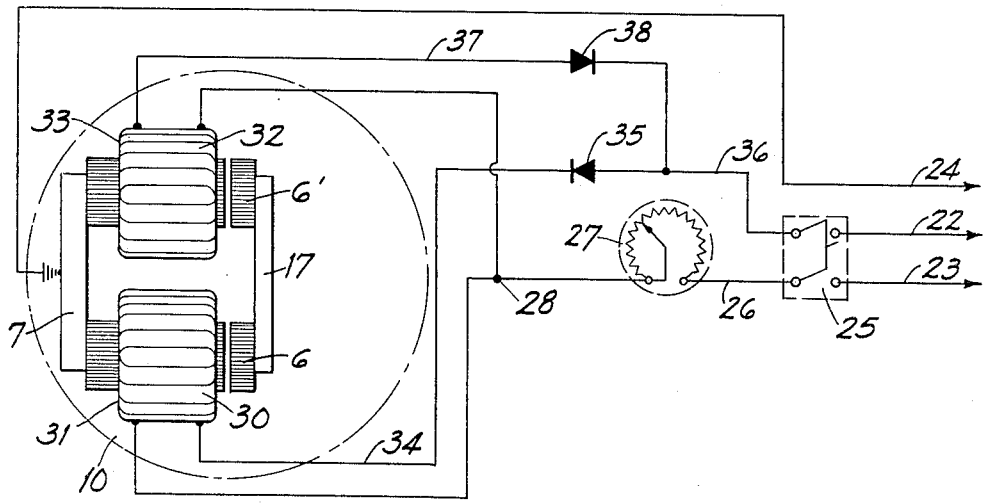
Fig. 4 is a circuit diagram of the electromagnetic motor shown in Figs. 1 to 3.

Referring to Figs. 1 and 2 of the drawings the vibratory motor comprising this invention is provided with a massive base or supporting element 1 which is preferably made as casting and is provided with rubber feet 2 for resiliently mounting the same on a table or floor. The base 1 has secured thereto the housing 3 which extends around the same and encloses the electromagnetic motor as indicated at 4. The electromagnetic motor comprises the field means as the field members 5 and 5' and the armature means as the armature members 6 and 6'. The field members are mounted on the upstanding bracket member 7 which is bolted, as indicated at 8, to the base.

The frame member 10 is resiliently supported by a plurality of flexible elements, such as indicated by the leaf spring members 11 secured at the opposite ends to the sloping seats 12 on the base 1 and the sloping seats 13 on the frame 10; there being four sets of springs 11 symmetrically mounted relative to the vertical central axis such as indicated with the dot and dash line 14.

As shown in Figs. 1 and 2 the frame member 10 may have secured thereto the upwardly open feeder bowl 15 by means of the bolts 16. The feeder bowl 15 is provided with a helical conveying surface around its inner perimetral surface which starts from the bottom of the bowl and extends spirally or helically up the inside of the bowl.

The armatures 6a and 6b of the motor shown in Fig. 3 are of the permanent magnet type and are wound and mounted so that each armature is attracted and repulsed on alternate half-cycles and thus function 180° out of phase with each other and without the need of a rectifier.

As shown in Figs. 1 and 2 the armature members 6 and 6' are secured to the bracket member 17 that is bolted to the underside of the frame 10 by means of the bolts 18. The bracket member 17 is preferably made of non-magnetic material so as not to disturb the magnetic fields from the spaced motors 5 and 5'. It will be noted that these magnetic motors are symmetrically positioned relative to the vertical central axis 14. The two coils of each field member are on one side of the axis and their respective armatures are aligned with the pole faces of the respective field members. It will also be noted in Fig. 1 that the vertical central axis 14 passes through the air gap such as indicated at 20 in Fig. 1. Thus the double-acting electromagnetic motor as shown in Figs. 1 and 2 provides an electromagnetic field on each side of the oscillatory axis 14 and, when the field member such as indicated at 5 is alternately energized with respect to the field member 5', each energized with one-half of a full alternating current wave, the armature means and the frame are caused to oscillate about the central vertical axis 14 and, since the frame is supported by the resilient members 11, it is caused to reciprocate in a confined inclined arcuate path of movement determined by the length and flexibility of these resilient members. Although the magnetic pull created by each electromagnetic field member causes the armature, its supporting bracket 17 and frame to reciprocate about the vertical axis 14; it is likewise caused to reciprocate in the confined inclined arcuate path of movement to thereby transmit a conveying action in a circular direction to the helical conveyor surface within the upwardly open feeder bowl 15. As the articles are fed upwardly around the inclined conveyor surface, as indicated at 21, the articles will be fed through the opening in the bowl and thereby raising the articles from one elevation to another.

As shown in Fig. 4 the alternating current supply line is indicated at 22 and 23. The casing is grounded by the line 24 in accord with required practice as indicated. The power lines 22 and 23 are interrupted by the switch 25 and the line 23 is connected through the switch by the wire 26 to the rheostat 27, and thence by the line 28 to one side of each of the coils 30, 31, 32 and 33. The other side of the coils 30 and 31 is connected by the wire 34 to the half-wave rectifier 35, and thence by the wire 36 to the other side of the switch 25 and to the line 22. The other side of each of the coils 32 and 33 is connected by the line 37 to the half-wave rectifier 38 which likewise is connected to the line 36 to complete the circuit. It will be noted that the rectifier 35 is connected to conduct in one direction, whereas the rectifier 38 is connected to conduct in the opposite direction; thus each rectifier admits the alternate half-wave current. Thus the coils 30 and 31 which are connected in multiple are supplied with half-wave current through the rectifier 35 when the line 22 is positive and the current is blocked at this time by the rectifier 38. When the line 23 becomes positive the rectifier 35 blocks any current flow therethrough and the rectifier 38 permits current to flow. Thus the coils 30 and 31 in multiple are energized at alternate halves of the cycle and the coils 32 and 33. Upon energizing the coils in this manner a double-acting force is applied to the armature means which in turn is transmitted to the bracket 17 to reciprocate the frame 10 in its confined inclined arcuate path of movement. By regulating the rheostat 27 one can change the voltage as applied to the multiple coils and thus vary the magnitude of vibration of the device.

Figure 5:
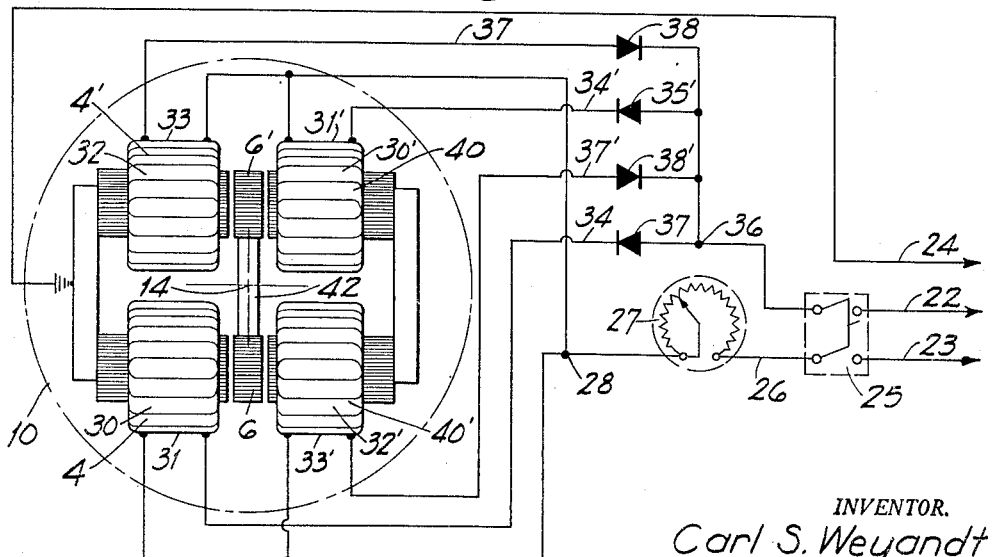
Fig. 5 is a circuit diagram of a dual double-acting electromagnetic motor comprising this invention.

As shown in Fig. 5 the electromagnetic field members 4 and 4' have been complemented by the electromagnetic field members 40 and 40'. Each field member is provided with two coils as disclosed in Figs. 1 and 2 and the single armature members 6 and 6' are employed for each of the double-acting electromagnetic motors. As shown the armatures 6 and 6' are supported by the frame 42 which is mounted symmetrically relative to the central axis 14, the latter passing through the center of the frame 42. Such a structure can be energized from a single stacked rectifier, however as shown, a rectifier is provided for each electromagnetic field and the additional motors are provided with additional lines for energizing the same. As shown an additional rectifier 35' is provided to connect the coils 30' and 31' by means of the line 34' and an additional rectifier 38' is provided to connect the additional coils 32' and 33' by means of the wire 37'. With this circuit the electromagnetic motors 4 and 40 are energized simultaneously and function to rotate the frame of the armature in a clockwise direction as viewed in Fig. 5, and upon the next half-cycle the electromagnetic field members 4' and 40' are energized to rotate the armature bracket 42 in a counterclockwise direction as shown in Fig. 5. Thus a total of eight coils, two for each electromagnetic field member, are employed in energizing this double-acting circular electromagnetic motor for oscillating the frame member in its confined inclined arcuate path of movement.

I claim:

1. A vibratory motor comprising a base, a frame, a plurality of tuned spring means disposed at an incline and positioned symmetrically about a central axis with their opposite ends attached to said base and to said frame to support the latter for reciprocation in a confined inclined arcuate path of movement about said central axis, armature means attached to said frame, a plurality of field members each having coil means and a core with a co-operating pole face adjacent said armature means, means to mount said field members so that the pole face of one field member is effective to transmit magnetic impulses in the opposite direction to the impulses horizontally transmitted by the pole face of another field member, and a circuit connection to each coil means including a half wave rectifier to alternately admit an energizing impulse to said one field member and then to said other field member to provide double-acting magnetic impulses through said pole faces to the armature means to reciprocate said frame in its confined inclined arcuate path of movement.

2. A vibratory motor comprising a base, a frame, a plurality of tuned spring means disposed at an incline and positioned symmetrically about a central axis with their opposite ends attached to said base and to said frame to support the latter for reciprocation in a confined inclined arcuate path of movement about said central axis, armature means attached to said frame in symmetrical relation to said central axis, a plurality of field members each having coil means and a core with a co-operating pole face adjacent said armature means, means to mount said field members so that the pole face of one field member is effective to transmit magnetic impulses in the opposite direction to the impulses horizontally transmitted by the pole face of another field member, and a circuit connection to each coil means including a half wave rectifier to alternately admit an energizing impulse to said one field member and then to said other field member to provide double-acting magnetic impulses through said pole faces to the armature means to reciprocate said frame in its confined inclined arcuate path of movement.

3. A vibratory motor comprising a base, a frame, a plurality of tuned spring means disposed at an incline and positioned symmetrically about a central axis with their opposite ends attached to said base and to said frame to support the latter for reciprocation in a confined inclined arcuate path of movement about said central axis, armature means attached to said frame, a plurality of field members each having coil means and a core with a co-operating pole face adjacent said armature means, means to mount said field members in pairs with the pole faces of a pair facing in opposite directions to one another to be effective to transmit magnetic impulses horizontally to the armature means in opposite directions, and a circuit connection to each coil means including a half wave rectifier to alternately admit an energizing impulse to said one field member and then to said other field member of a pair to provide double-acting magnetic impulses through said pole faces to the armature means to reciprocate said frame in its confined inclined arcuate path of movement.

4. A vibratory motor comprising a base, a frame, a plurality of spring means disposed at an incline and positioned symmetrically about a central axis with their opposite ends attached to said base and to said frame to support the latter for reciprocation in a confined inclined arcuate path of movement about said central axis, armature means attached to said frame, a plurality of electromagnetic field members with a co-operating pole face adjacent said armature means, and a circuit connecting said field members to permit alternate energization to establish predetermined polarity effective on the armature means in each direction to reciprocate the frame about said central axis in its confined inclined arcuate path of movement when the circuit is connected to an alternating current source.

5. A vibratory motor comprising a supporting element, a frame, flexible elements positioned symmetrically about a central axis and mounted between the supporting element and frame so that the former may be reciprocated in a confined inclined arcuate path of movement about said central axis, armature means attached to said frame, a plurality of electromagnetic field members with a co-operating pole face adjacent said armature means, and a circuit connecting said field members to permit alternate energization to establish predetermined polarity effective on the armature means in each direction to reciprocate the frame about said central axis in its confined inclined arcuate path of movement when the circuit is connected to an alternating current source.

6. A vibratory motor comprising a base, a frame, a plurality of spring means disposed at an incline and positioned symmetrically about a central axis with their opposite ends attached to said base and to said frame to support the latter for reciprocation in a confined inclined arcuate path of movement about said central axis, armature means attached to said frame, a plurality of electromagnetic field members with a co-operating pole face adjacent said armature means, and a circuit connecting said field members and including a rectifier to permit alternate energization of selected of said field members and produce a reciprocating force electromagnetically on the armature means in each direction about said central axis to reciprocate the frame in its confined inclined arcuate path of movement when the circuit is connected to an alternating current source.

7. A vibratory motor comprising a base, a frame, a plurality of spring means disposed at an incline and positioned symmetrically about a central axis with their opposite ends attached to said base and to said frame to support the latter for reciprocation in a confined inclined arcuate path of movement about said central axis, armature means attached to said frame, a plurality of electromagnetic field members with a co-operating pole face adjacent said armature means, and a circuit connecting said field members to permit energization of selected of said field members displaced 180 mechanical degrees apart to be energized by half-wave current impulses 180 electrical degrees apart to produce alternate attracting forces to reciprocate the frame in each direction about said central axis in its confined inclined arcuate path of movement when the circuit is connected to a source of power.

8. A vibratory motor comprising a base, a frame, a plurality of spring means disposed at an incline and positioned symmetrically about a central axis with their opposite ends attached to said base and to said frame to support the latter for reciprocation in a confined inclined arcuate path of movement about said central axis, armature means attached to said frame, a plurality of electromagnetic field members with a co-operating pole face adjacent said armature means, a circuit to connect said field members to an energizing alternating current source, and means to effect alternate attracting forces by selected field members on the armature means to reciprocate the frame electromagnetically in both directions about said central axis following the alternate halves of an alternating current source.

CARL S. WEYANDT.

References Cited in the file of this patent

UNITED STATES PATENTS

| Number | Name | Date |
|---|---|---|
| 1,725,203 | McNerney | Aug. 20, 1929 |
| 2,464,216 | Devol | Mar. 15, 1949 |